United States Patent [19]
Okisaki et al.

[11] Patent Number: 5,942,561
[45] Date of Patent: *Aug. 24, 1999

[54] FIRE-RETARDANT POLYMER COMPOSITION

[75] Inventors: Fumio Okisaki, Mie; Akinori Hamada, Yamaguchi; Shunichi Endo; Genichiro Ochiai, both of Ibaraki, all of Japan

[73] Assignee: Tosoh Corporation, Yamaguchi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/610,134

[22] Filed: Feb. 29, 1996

[30] Foreign Application Priority Data

Mar. 3, 1995 [JP] Japan .................................... 7-044376

[51] Int. Cl.$^6$ .............................. C09K 21/14; C08K 3/04
[52] U.S. Cl. .......................... 523/179; 523/200; 523/205; 523/210; 524/495; 524/496; 524/416; 524/417; 252/606; 252/609; 252/378 R
[58] Field of Search .................................... 523/179, 200, 523/205, 210; 524/495, 416, 496, 417, 584, 586, 566, 605; 528/485, 487, 488, 489, 490; 252/606, 609, 378 R

[56] References Cited

U.S. PATENT DOCUMENTS

| | | | |
|---|---|---|---|
| 4,272,346 | 6/1981 | Jakubowski et al. | 428/367 |
| 4,694,030 | 9/1987 | von Bonin et al. | 523/179 |
| 5,173,515 | 12/1992 | von Bonin et al. | 521/103 |
| 5,298,536 | 3/1994 | Babcock et al. | 523/201 |
| 5,382,387 | 1/1995 | von Bonin | 252/602 |
| 5,414,031 | 5/1995 | Knox | 524/101 |
| 5,432,225 | 7/1995 | Nakamura et al. | 524/495 |
| 5,650,448 | 7/1997 | Wallace et al. | 521/82 |

FOREIGN PATENT DOCUMENTS

| | | |
|---|---|---|
| 0243576 | 11/1987 | Germany . |
| 0302987 | 2/1989 | Germany . |
| 0400402 | 12/1990 | Germany . |
| 0468259 | 1/1992 | Germany . |
| 0531843 | 3/1993 | Germany . |
| 6025476 | 2/1994 | Japan . |
| 6073251 | 3/1994 | Japan . |

OTHER PUBLICATIONS

JP 03–041163 As Abstracted by Derwent Accession No. 91–097793, 1991.

Derwent Abstract No. 94–124183 entitled: "Flame–retardant Resin Compsn. For Automobile Industry etc–comprising sytrene resin, red phosphorus and graphite rapidly expanding or heating" (1994).

Derwent Abstract No. 94–072057 entitled: "Flame–resistant Polyolefin resin Compsn. not evolving corrosive gases contg. red phosphorous heat expanding graphite and phosphorus cpds." 1994.

Hawley's Condensed Chemical Dictionary, 11$^{th}$ Ed. Van Nostrand Reinhold Company, New York (1987), Citation For "elastomer" is found on pages 453–454.

*Primary Examiner*—Joseph D. Anthony
*Attorney, Agent, or Firm*—Sughrue, Mion, Zinn, Macpeak & Seas, PLLC

[57] ABSTRACT

A fire-retardant polymer composition is provided which comprises 100 parts by weight of a polymer such as polystyrene, 1 to 30 parts by weight of heat-expandable graphite, and 1 to 30 parts by weight of a phosphorus compound. The polymer composition is fire-retardant, and emits less smoke and less corrosive gas on burning.

14 Claims, No Drawings

FIRE-RETARDANT POLYMER COMPOSITION

BACKGROUND OF THE INVENTION

1. Field of the Invention

The present invention relates to a polymer material which has excellent fire-retardancy, and emits less corrosive gas and less smoke on burning.

2. Description of the Related Art

Polymer materials are desired to be fire-retardant to prevent fire accident or fire spreading in use for insulating materials such as electric wires and cables; sheath materials; enclosures and internal parts of electric, electronic, and office automation apparatuses; interior materials of vehicles; and building materials, and so forth. Many polymer materials for such uses are enforced to be fire retardant by legislation. For fire retardancy of polymer materials, known fire-retardant additives include halogen type fire-retardant additives, magnesium hydroxide, aluminum hydroxide, red phosphorus, and phosphorus compounds. These fire-retardant materials, however, are not perfect, and have disadvantages below.

The halogen type fire-retardant additives, which give a high level of fire retardancy (for example, UL-94V-0, V-1, or V-2) with a small amount of addition, generate soot or smoke in a larger amount on burning. Further, the halogen type fire-retardant additives emit more or less acidic substances such as a hydrogen halide by heat of processing or at the time of fire accident, which would cause corrosion of the machines for resin processing, or produce adverse effects on human health or apparatuses in the vicinity of a fire site.

Metal hydroxides as the fire retardant, such as magnesium hydroxide and aluminum hydroxide, are required to be added to the resin in a larger amount, although they do not emit smoke or corrosive gas. The addition thereof in a larger amount will impair the mechanical strength, light-weight, and other characteristics of the polymer.

The phosphorus type fire-retardant additives such as red phosphorus and phosphoric acid esters are effective in a small amount for polyamides, polyesters, polyphenylene oxides and other engineering plastics. However, they produce less effect of fire retardancy for general purpose polymers such as polyolefins and polystyrenes.

Therefore, a fire-retardant additive is demanded which contains no halogen, emits less smoke and less corrosive gas, and is effective in a smaller amount of addition. Promising techniques there for have been disclosed in which heat-expandable graphite and a synergist are used in combination.

Japanese Patent Laid-Open Publication 6-73251, for example, discloses fire-retardation of polystyrene by addition of a small amount of red phosphorus and heat-expandable graphite in combination. The system of a combination of the heat-expandable graphite and red phosphorus is required to be improved more in smoke retardation although it gives high fire retardancy. Therefore, a synergist for the heat-expandable graphite is sought which achieves effective retardation of smoking.

SUMMARY OF THE INVENTION

The present invention has been accomplished, after comprehensive investigation, based on the findings that a certain phosphorus compound is synergistic with the heat-extensible graphite, and has an effect of retardation of smoking.

The present invention intends to provide a fire-retardant polymer composition which has excellent fire-retardancy, and emits less corrosive gas and less smoke on burning.

The fire-retardant polymer composition of the present invention comprises three components A,B and C below essentially:

(A) 100 parts by weight of a polymer,
(b) 1 to 30 parts by weight of a polymer,
(c)1 to 30 parts by weight of a phosphorus compound.
wherein the polymer of Component A is one or more polymers selected from the group of polysiloxanes; and the heat-expandable graphite changes the specific volume thereof on rapid heating from room temperature to 800–1000° C. by 100 mL/g or more.

DETAILED DESCRIPTION OF THE PREFERRED EMBODIMENT

The fire-retardant polymer composition of the present invention comprises three components A, B, and C below essentially:

(A) 100 parts by weight of a polymer,
(B) 1 to 30 parts by weight of heat-expandable graphite, and
(C) 1 to 30 parts by weight of a phosphorus compound.

Component A of the composition of the present invention is one or more of polymers selected from the group of polystyrenes, elastomers, polyurethanes, and polysiloxanes.

The polystyrene in the present invention is a polymer produced from a styrene type monomer including styrene, α-methylpolystyrene, vinyltoluene, vinyinaphthalene, and so forth. The polystyrene includes homopolymers of styrene, rubber-modified high-impact polystyrenes (hereinafter referred to as "HIPS"), acrylonitrile-butadiene-styrene copolymers (hereinafter referred to as "ABS"), and (meth) acrylic rubbers and ethylene-propylene copolymers grafted with an acrylic monomer and a styrenic monomer.

The elastomer in the present invention includes hydrocarbon type elastomers such as natural rubbers (hereinafter referred to as "NR rubber"), styrene-butadiene rubbers (hereinafter referred to as "SBK rubber"), polyisoprenes, nitrile rubbers, acrylate rubbers, butyl rubbers, epichiorohydrin rubbers, styrene-butadiene block copolymers, styrene-isoprene block copolymers, styrene-ethylene-butene-styrene block copolymers, hydrogenated SBR and polybutadiene.

The polyurethane in the present invention includes flexible polyurethane foams, rigid polyurethane foams, polyurethane fibers, and polyurethane paints, which are produced from an isocyanate such as disiocyanate and a polyhydric alcohol such as polypropylene glycol.

The polysiloxane in the present invention includes poly-organosiloxanes having a side chain of alkyl, alkenyl, phenyl, or the like, specifically exemplified by silicone elastomers, room temperature-curing silicone rubbers, cold-setting silicone elastomers, silicone sealants, ana silicone resins.

The polymer employed in the present invention is not limited to a single polymer, but may be a mixture of two or more thereof or with other polymer or polymers according to desired properties of the polymer.

Component B of the composition of the present invention is heat-expandable graphite. The heat-expandable graphite is derived from natural graphite or artificial graphite, and expands on rapid heating from room temperature to 800–1000° C. in the c-axis direction of the crystal with the specific volume change of not less than 100 mL/g by the temperature change. This expandability is favorable because the one exhibiting the specific volume difference of not less than 100 mL/g by the rapid heating gives much more fire retardancy than the one of less than 100 mL/g. The extensibility in the present invention means the difference of the specific volume (mL/g) after the heating from that at room temperature.

The extensibility is measured specifically as follows. A quartz beaker is heated previously to 1000° C. in an electric furnace. Two grams of heat-expandable graphite is introduced into this quartz beaker quickly, and the quartz beaker is placed immediately in the electric furnace for 10 seconds to cause extension of the graphite. The weight of 100 mL of the extended graphite is measured to obtain the loosene apparent specific gravity (g/mL).

[Specific volume]=1/[Loosened apparent specific gravity]

Separately, the specific volume of the unheated heat-expandable graphite is obtained at room temperature similarly.

[Expandability]=[Specific volume after heating]–[Specific volume at room temperature]

The heat-expandable graphite of the present invention extends by heating only in the a-axis direction, but expands little in the a-axis direction and the b-axis direction according to electron microscopical observation.

The process for producing the heat-expandable graphite of the present invention is not specially limited. It can be obtained, for example, by oxidation treatment of natural graphite or artificial graphite. The oxidation is conducted, for example, by treatment with an oxidizing agent such as hydrogen peroxide and nitric acid in sulfuric acid. Otherwise, the heat-expandable graphite can also be produced by reduction treatment of graphite. The reduction is conducted, for example, by treatment with sodium naphthalenide in an aprotic organic solvent, or the like method.

The particle size of the heat-expandable graphite of the present invention affects the fire retardancy of the resulting polymer composition. In a preferred particle size distribution, the graphite contains the particles passing through a 80 mesh sieve at a content of 20% or lower by weight, more preferably from 1% to 20% by weight. The graphite which contains the particles passing through a 80 mesh sieve at a content of higher than 20% by weight will not give sufficient fire retardancy, while the graphite containing the above particles at a content of lower than 1% by weight would slightly deteriorate shape-retaining properties or the resin composition when the resin composition is exposed to fire.

The heat-expandable graphite has preferably a particle size larger than a certain level as mentioned above. In a preferred embodiment, the surface of the heat-expandable graphite particles is surface-treated with a silane-coupling agent, or a titanate-coupling agent in order to prevent the adverse effects of larger particles on the properties of the polymer composition.

The heat-expandable graphite, which is produced by oxidation in sulfuric acid or the like process as described above, can be slightly acidic depending on the process conditions. When the graphite is acidic, corrosion of the apparatus for production or processing of the polymer composition can be inhibited by addition of an alkaline substance such as magnesium and aluminum hydroxide to the composition. The alkaline substance is preferably allowed to exist close to the heat-expandable graphite particles for efficient corrosion prevention. For this purpose, the alkaline substance is preferably mixed with the heat-expandable graphite preliminarily to adhere to the surface of the heat-expandable graphite surface. The alkaline substance is added in an amount of less than 10% by weight of the heat-expandable graphite.

Component C in the present invention may be any phosphorus compound which exhibits synergism with the heat-expandable graphite of Component B and inhibits smoking. Suitable phosphorus compounds include esters of oxo-acids of phosphorus (hereinafter referred to as "phosphoric acid"), phosphoric acid salts, phosphoric acid ester salts, and condensed phosphoric acid salts. Among them, those containing nitrogen produce high fire retardancy, specifically exemplified by nitrogen-containing phosphate salts such as ammonium polyphosphate, melamine-modified ammonium polyphosphate, melamine polyphosphate, and melamine phosphate. Of these, ammonium polyphosphate is most suitable because of its high phosphorus content. In particular, in uses requiring water resistance, the ammonium polyphosphate is preferably coated on the surface with a polymer such as a melamine resin, a urea resin, and a phenol resin.

The combined use of the phosphorus compound with the heat-expandable graphite is novel except for the use for polyolefin resins. Japanese Patent Laid-Open Publication 6-25476 describes use of combination of a phosphorus compound and heat-expandable graphite. However, this is a disclosure limited to a fire-retarding technique for olefin type polymers. Generally, the same fire-retardant additive gives quite different performance in fire retardation depending on the kind of the employed polymer. Therefore, a fire retardant additive effective for polyolefins cannot be expected to be effective also to other kinds of polymers.

In the composition of the present invention, Component B and Component C are used respectively in an amount of from 1 to 30 parts by weight to 100 parts by weight of Component A. With the respective amounts of Component B and Component C of one part by weight or less, the fire retardancy of the polymer is not sufficient, while with the respective amounts thereof of 30 parts by weight or more, the rate of increase of the fire retardancy becomes lower, and the polymer properties come to be impaired.

In another embodiment, red phosphorus is employed in addition to the three Components A, B, and C. Since Component C is a compound of phosphorus, the content of phosphorus, the fire retarding element, is lower than red phosphorus. The additional use of a small amount of red phosphorus as simple phosphorus will lead to a high level of the fire retardancy and a low level of the smoke emission with a smaller amount of the total fire retardant additive in comparison with the case where the red phosphorus is not used.

The red phosphorus is particularly preferably treated at the surface with one or more compounds selected from the group of thermosetting resins and inorganic compounds in view of safety in handling.

The thermosetting resin includes phenol resins, and melamine resins, but is not specially limited thereto. The inorganic compound includes hydroxides and oxides of magnesium, aluminum, nickel, iron, cobalt, and the like, but is not specially limited thereto.

The amount of the red phosphorus additionally employed is in the range of from 0.1 to 20 parts by weight to 100 parts by weight of the polymer. With the amount thereof of less than 0.1 part by weight, sufficient fire retardancy is not achieved, while with the amount thereof of more than 20 parts, the rate of increase of the fire retardancy is lower.

The polymer composition of the present invention may further contain another fire retarding additive such as a metal hydroxide like magnesium hydroxide or aluminum hydroxide in such an amount that the effect of the present invention is not impaired. Further, the polymer composition may contain other kinds of additive such as inorganic fillers, colorants, antioxidants, light stabilizers, light absorbing agents, plasticizers, process oils, crosslinking agents, and blowing agents.

The polymer may be crosslinked by water-crosslinking or ionizing radiation.

The above-described fire-retardation technique of the present invention produces a polymer composition containing no halogen, having high fire retardancy, and emitting less smoke.

The present invention is described below more specifically by reference to example without limiting the invention in any way.

In Examples and Comparative Examples, the materials used are as below ("parts" is based on weight unless otherwise mentioned):

Component A (A1) HIPS (HT-65: Mitsubishi Kagaku K.K.)

(A2) ABS (Toyolack 100: Toray Industries, Inc.)

(A3) Compound produced by roll-blending: 100 parts of natural rubber (RSS-3 from Malaysia) as the base, 2.5 parts of sulfur, 5 parts of zinc white (Sakai Chemical Industry Co.), 2 parts of stearic acid, 75 parts of hard top clay (Shiraishi Calcium K.K.), 1.25 parts of Accelerator CZ (Nocceler CZ, Ouchi Shinko K.K.), 0.3 part of Accelerator TT (Nocceler TT, Ouchi Sninko K.K.), 1 part of age resister (Nocrack-810A, Ouchi Shinko K.K.)

(A4) Compound produced by roll-blending: 100 parts of SBR (Sorprene, Asahi Chemical Industry Co.) as the base, 6 parts of sulfur, 2 parts of zinc white (No.1. Sakai Chemical Industry Co.), 2.5 parts of stearic acid, 55 parts of white carbon (Nip Sil VN3, Nippon Silica K.K.), 20 parts of naphthene oil (Diana Process Oil, Idemitsu Kosan K.K.), 5.5 parts of diethylene glycol, 1.7 parts of Accelerator DM (Nocceler DM, Ouchi Shinko K.K.), 0.6 part of Accelerator D (Nocceler D, Ouchi Shinko K.K.), 1 part of age resister (Nocrack-SP, Ouchi Shinko K.K.)

(A5) Compound produced by blending: 100 parts of polyetherpolyol (MN-3050, Mitsui Toatsu Chemicals, Inc.), 55 parts of tolylene diisocyanate (T-80, Nippon Polyurethane Industry Co.), 4 parts of water, 0.3 part of triethylenediamine (Tosoh Corp.), 0.2 part of N-ethylmorpholine (NEM, Nippon Nyukazai K.K.), 0.35 part of Neostan dioctate (U-28, Nitto Kasei K.K.), 1.2 parts of silicone foam stabilizer (L-580, Nippon Unicar Co.), and 10 parts of dichloromethane (A6) Compound produced by blending: 100 parts of polymethylvinylsilicone rubber compound (KE-650-U, Shin-Etsu Chemical Co.), 2 parts of Accelerator C-8 (Shin-Etsu Chemical Co.) containing 2,5-dimethyl-2,5-bis(t-butylperoxy)-hexane (about 25%)

Component B (B1) Heat-expandable graphite without surface treatment (CA-60, Chuo Kasei K.K.)

(B2) Heat-expandable graphite having the surface treated with a silane coupling agent (CA-60S, Chuo Kasei K.K.)

(B3) Heat-expandable graphite mixed preliminarily with magnesium hydroxide (CA-60N, Chuo Kasei K.K.) In a mixing amount of several percent of the hydroxide to the graphite.

The expandability and the particle size distribution of Components B1 to B3 are shown in Table 1.

TABLE 1

|    | Expandability[1] (mL/g) | Particle size distribution[2] (% by weight) |
|----|---|---|
| B1 | 213 | 4 |
| B2 | 208 | 4 |
| B3 | 202 | 5 |

[1] Change of specific volume on rapid heating from room temperature to 800–1000° C.
[2] Particles passing through 80 mesh sieve Component C (C1) Ammonium polyphosphate having the surface treated with a melamine resin (Nova White PA-6, Rin Kagaku K.K.)

(C2) Ammonium polyphosphate without surface treatment (Nova White PA-2, Rin Kagaku K.K.)

Component D (D1) Red phosphorus having a treated surface (Nova Red 120, Rin Kagaku K.K.)

Component E (E1) Mixture of brominated epoxy polymer (TB-60, Tohto Kasei K.K.) and antimony trioxide in a ratio of 7/1 by weight (E2) Mixture of chlorinated polyethylene (G235, Daiso K.K.), tetrabromobisphenol A (Flame Cut 120G, Tosoh Corp.), and antimony trioxide in a ratio of 5/22/8 by weight (E3) Mixture of decabromodiphenyl oxide (Flame Cut 110R, Tosoh Corp.), and antimony trioxide in a ratio of 3/1 by weight (E4) Mixture of chlorinated paraffin (A-70, Tosoh Corp.) and antimony tri oxide in a ratio of 1/1 by weight (E5) Tris(chloropropyl) phosphate (Firole PCF, Akzo Kashima K.K.)

EXAMPLES 1–11 AND COMPARATIVE EXAMPLES 1–8

The starting materials were blended by extrusion in a formulation ratios as shown in Table 2. The test specimens were prepared by injection molding. The fire retardancy was evaluated by measurement of the oxygen index (hereinafter referred to as "OI") according to JIS K7201, and vertical flame test according to UL-94. The smoke emission was measured by the NBS method in the flame mode. In the smoke emission test, the thickness of the specimen was 1/16 inch for HIPS (A1), and 1/32 for ABS (A2). The results are shown in Table 2. The smoke emission was represented by the maximum value of the smoke density ($D_{max}$).

TABLE 2

| | | Component | | | | | | | UL-94 | $D_{max}$ |
|---|---|---|---|---|---|---|---|---|---|---|
| | A | B | phr | C | phr | D | phr | E | phr | | |
| Example | | | | | | | | | | | |
| 1 | A1 | B1 | 5 | C1 | 15 | — | | — | | V2 | 252 |
| 2 | A1 | B1 | 10 | C1 | 15 | — | | — | | V0 | 220 |
| 3 | A1 | B1 | 15 | C1 | 15 | — | | — | | V0 | 162 |
| 4 | A1 | B1 | 20 | C1 | 15 | — | | — | | V0 | 158 |
| 5 | A1 | B1 | 15 | C1 | 5 | — | | — | | V0 | 246 |
| 6 | A1 | B1 | 15 | C1 | 20 | — | | — | | V0 | 157 |
| 7 | A1 | B1 | 15 | C2 | 15 | — | | — | | V0 | 163 |
| 8 | A1 | B2 | 15 | C1 | 15 | — | | — | | V0 | 161 |

TABLE 2-continued

| | Component | | | | | | | | UL- | |
|---|---|---|---|---|---|---|---|---|---|---|
| | A | B | phr | C | phr | D | phr | E | phr | 94 | $D_{max}$ |
| 9 | A1 | B3 | 15 | C1 | 15 | — | | — | | V0 | 161 |
| 10 | A1 | B1 | 6 | C1 | 2 | D1 | 2 | — | | V0 | 170 |
| Comparative example | | | | | | | | | | | |
| 1 | A1 | — | | — | | — | | — | | NR | >500 |
| 2 | A1 | B1 | 20 | — | | — | | — | | NR | >500 |
| 3 | A1 | — | | C1 | 20 | — | | — | | NR | >500 |
| 4 | A1 | B1 | 10 | — | | D1 | 5 | — | | V0 | 497 |
| 5 | A1 | — | | — | | — | | E1 | 22 | V0 | >500 |
| 6 | A2 | — | | — | | — | | — | | NR | >500 |
| Example | | | | | | | | | | | |
| 11 | A2 | B1 | 20 | C1 | 20 | — | | — | | V0 | 154 |
| 12 | A2 | B1 | 6 | C1 | 2 | D1 | 2 | — | | V0 | 164 |
| Comparative example | | | | | | | | | | | |
| 7 | A2 | B1 | 10 | — | | D1 | 5 | — | | V0 | 480 |
| 8 | A2 | — | | — | | — | | E2 | 54 | V0 | >500 |

The results are explained for high-impact polystyrene (A1) as Component A. In Comparative Examples 2 and 3, the single use of Component B (heat-expandable graphite) or Component C does not improve the fire retardancy. In Examples 1–9, the use of the combination of Component B and component C synergistically and greatly improves the fire retardancy of the high-impact polystyrene. In Examples 3 and 7, the surface treatment of the ammonium polyphosphate does not affect adversely the fire retardancy. In Examples 3, 8, and 9, the surface treatment of the heat-expandable graphite (Component B) or the treatment thereof with magnesium hydroxide does not affect the fire retardancy. In Example 10, the additional use of red phosphorus (Component D) enables reduction of the total amount of the fire-retardant additives. The remarkable effect of the fire retardation technique of the present invention in retarding smoke emission is obvious in comparison with the effect of a bromine type fire-retardant additive, from Examples 1–9 and Comparative Example 5. Further, the effect of the present invention in smoke emission retardation is remarkable in comparison with the effect obtained by combination of the heat-expandable graphite with red phosphorus (Comparative Example 4).

In the case where ABS (A2) is used as Component A, the high fire retardancy and low smoke emission are achieved by the present invention as shown in Table 2.

EXAMPLES 12–15 AND COMPARATIVE EXAMPLES 9–10

The natural rubber or SBR was used as the elastomer. The starting materials were blended with a roll in the blending ratios as shown in Table 3. The test specimens were prepared by curing by compression molding. The obtained elastomer composition was evaluated for fire retardancy according to JIS K7201, and for smoke emission by the NBS method in the flame mode. The results are shown in Table 3.

TABLE 3

| | Component | | | | | | | | Oxygen index | |
|---|---|---|---|---|---|---|---|---|---|---|
| | A | B | phr | C | phr | D | phr | E | phr | (%) | $D_{max}$ |
| Example | | | | | | | | | | | |
| 12 | A3 | B1 | 15 | C1 | 15 | — | | — | | 25.4 | 115 |
| 13 | A3 | B1 | 10 | C1 | 15 | D1 | 2 | — | | 26.2 | 151 |
| Comparative example | | | | | | | | | | | |
| 9 | A3 | — | | — | | — | | E4 | 30 | 23.6 | 461 |
| Example | | | | | | | | | | | |
| 14 | A4 | B1 | 15 | C1 | 15 | — | | — | | 25.0 | 157 |
| 15 | A4 | B1 | 10 | C1 | 5 | D1 | 2 | — | | 25.8 | 194 |
| Comparative example | | | | | | | | | | | |
| 10 | A4 | — | | — | | — | | E4 | 30 | 23.6 | 492 |

* A3:187.05(phr), A4:194.3(phr)

As shown in Table 3, the elastomer compositions of Examples have sufficiently high fire retardancy and emit less smoke in comparison with the compositions of Comparative Examples.

EXAMPLES 16–17 AND COMPARATIVE EXAMPLE 11

The test specimens of the polyurethane composition were prepared by mixing and reacting the starting materials at the mixing ratios shown in Table 4. The resulting polyurethane compositions were evaluated for fire retardancy according to FMVSS-302, and smoke emission according to the NBS method in the flame mode. The results are shown in Table 4.

TABLE 4

| | Component | | | | | Burning | |
|---|---|---|---|---|---|---|---|
| | A | B phr | C phr | D phr | E phr | distance (cm) | $D_{max}$ |
| Example | | | | | | | |
| 16 | A5 | B1 3 | C1 2 | — | — | 20 | 22 |
| 17 | A5 | B1 2 | C1 2 | D1 1.5 | — | 25 | 36 |
| Comparative example | | | | | | | |
| 11 | A5 | — | — | — | E3 5 | 30 | 106 |

As shown in Table 4, the fire-retardant polyurethane compositions of Examples have sufficiently high fire retardancy and emit less smoke in comparison with the composition of Comparative Example.

EXAMPLES 18–19 AND COMPARATIVE EXAMPLE 12

The polymethylvinylsiloxane rubber compound was employed as the polysiloxane. The starting materials were blended with a roll in the blending ratios as shown in Table 5. The test specimens were prepared by curing by compression molding. The obtained polysiloxane composition was evaluated for fire retardancy according to JIS K7201, and for smoke emission according to the NBS method in the flame mode. The results are shown in Table 5.

TABLE 5

| | A | B | phr | C | phr | D | phr | E | phr | Oxygen index (%) | $D_{max}$ |
|---|---|---|---|---|---|---|---|---|---|---|---|
| Example | | | | | | | | | | | |
| 18 | A6 | B1 | 20 | C1 | 10 | — | | — | | 35.5 | 261 |
| 19 | A6 | B1 | 20 | C1 | 10 | D1 | 2 | — | | 36.5 | 305 |
| Comparative example | | | | | | | | | | | |
| 12 | A6 | — | | — | | — | | E3 | 30 | 25.9 | >500 |

As shown in Table 5, the fire-retardant polysiloxane compositions of Examples have sufficiently high fire retardancy and emit less smoke in comparison with the composition of Comparative Example.

What is claimed is:

1. A halogen element free fire-retardant polymer composition, comprising a physical blend of three separate component A, B, And C:

(A) 100 parts by weight of a polymer (B) 1 to 30 parts by weight of heat-expandable graphite, and (C) 1 to 30 parts by weight of a phosphorus compound, wherein the polymer of Component A is one or more polymers selected from the group consisting of polystyrenes; and the heat expandable graphite changes in specific volume thereof on rapid heating from room temperature to 800–1000° C. by 100 mL/g or more.

2. The fire-retardant polymer composition according to claim 1, wherein the heat-expandable graphite has particle size distribution in which not more than 20% by weight of the particles pass through a 80 mesh sieve.

3. The fire-retardant polymer composition according to claim 1, wherein the heat-expandable graphite is surface-treated with one or more coupling agent selected from silane-coupling agents and titanate-coupling agents.

4. The fire-retardant polymer composition according to claim 1, wherein the heat-expandable graphite is mixed preliminarily with magnesium hydroxide and/or aluminum hydroxide.

5. The fire-retardant polymer composition according to claim 1, wherein the composition further contains red phosphorus at a content of from 0.1 to 20 parts by weight to 100 parts by weight of Component A.

6. The fire-retardant polymer composition according to claim 5, wherein the red phosphorus is treated at the surface thereof with one or more compounds selected from thermosetting resins and inorganic compounds.

7. The fire-retardant polymer composition according to claim 1, wherein the phosphorus compound is one or more compounds selected from the group consisting of esters of an oxo-acid of phosphorus (hereinafter referred to as "phosphoric acid"), salts of phosphoric acid, salts of phosphoric acid esters, and salts of condensed phosphoric acids.

8. The fire-retardant polymer composition according to claim 7, wherein the phosphorus compound is a compound containing nitrogen.

9. The fire-retardant polymer composition according to claim 7, wherein the salt of the condensed phosphoric acids is used and the salt is ammonium polyphosphate.

10. The fire-retardant polymer composition according to claim 9, wherein the ammonium polyphosphate is coated with a thermosetting resin.

11. The fire-retardant polymer composition according to claim 7, wherein the phosphorus compound is the esters of an oxo-acid of phosphorus.

12. The fire-retardant polymer composition according to claim 7, wherein the phosphorus compound is the salts of phosphoric acid.

13. The fire-retardant polymer composition according to claim 7, wherein the phosphorus compound is the salts of phosphoric acid esters.

14. The fire-retardant polymer composition according to claim 7, wherein the phosphorus compound is the salts of condensed phosphoric acid.

* * * * *